(12) United States Patent

Goss et al.

(10) Patent No.: US 6,170,630 B1
(45) Date of Patent: Jan. 9, 2001

(54) TRANSPORTATION APPARATUS FOR SYSTEM MONITORED OPERATIONS TESTING

(75) Inventors: Virginia J. Goss, Wendell; James N. Smith, Raleigh; Robert A. McCord, Jr., Apex, all of NC (US)

(73) Assignee: International Business Machine Corporation, Armonk, NY (US)

(*) Notice: Under 35 U.S.C. 154(b), the term of this patent shall be extended for 0 days.

(21) Appl. No.: 09/333,098

(22) Filed: Jun. 15, 1999

(51) Int. Cl.[7] .................. B65G 13/00; B65G 15/64; B65G 37/00; B65G 43/08; B65G 49/02

(52) U.S. Cl. ............... 193/35 A; 198/346.2; 198/364; 198/465.1

(58) Field of Search .............. 193/35 R; 198/346.2, 198/364, 370.09, 570, 465.1, 530

(56) References Cited

U.S. PATENT DOCUMENTS 5,388,684 * 2/1995 Peck .................. 198/465.1 X
5,873,449 * 2/1999 Davenport ............... 198/586 X
5,944,169 * 8/1999 Allen ..................... 193/35 R X
5,951,228 * 9/1999 Pfeiffer et al. ........... 193/35 R X

* cited by examiner

Primary Examiner—Christopher P. Ellis
Assistant Examiner—Gene O. Crawford
(74) Attorney, Agent, or Firm—Bernard D. Bogdon; Andrew Dillon

(57) ABSTRACT

A system monitored operations test area utilizes a central feed spur to deliver assembled products to parallel rows of test stations on each of its sides. A pivotal, sliding lift gate is mounted to each side of the central spur and is movable between vertical and horizontal positions. The gate can be moved along the length of the spur as needed. When the lift gate is in place, the operator can slide a unit into a desired test slot across the horizontally disposed gate which spans the distance between the spur and the selected test station.

13 Claims, 11 Drawing Sheets

TRANSPORTATION APPARATUS FOR SYSTEM MONITORED OPERATIONS TESTING

BACKGROUND OF THE INVENTION

1. Technical Field

This invention relates to the presentation of parts and packaging materials to a manufacturing line, and the packaging process on a manufacturing line. More specifically, it addresses how to present parts to support a highly flexible process with minimal impact from job change-over, and how to present materials to maintain efficiency; and utilize material handling equipment to improve the ergonomics of the process.

2. Background Art

In a high tech electronics manufacturing process that has many different components in each model, the parts for the product currently being built must be readily accessible during the assembly process. These parts are often purchased from many different vendors and typically arrive in bulk (pallets of boxes with multiple parts per box). They are seldom made in the same facility that assembles the final product. If they are produced at the same facility, it is typically in a different area. For an assembly process, the majority of the manufacturing setup time for a batch consists of making sure the required components are accessible to the assembler. In a manufacturing cell environment where operations have been streamlined, it is critical that setup times are reduced.

There are various ways to present these parts to the assembly operator to maximize efficiency depending on the business strategy. If the strategy is based on large orders of a specific model (i.e. build to plan, build to order for a dealer), the entire box of each part is often presented directly to the assembler using flow-racks or other material handling aids. If the strategy is oriented towards small orders (i.e. build to order for specific customers), a conventional kitting process may be implemented so a single set of parts or "squared" sets of parts for the job size are presented.

Conventional methods typically work well for one strategy or the other, but not both. The bulk presentation approach has a much longer setup time. If the bulk approach is used, some subset of the parts (if not all) have to be changed before the next product can be built, increasing the setup time. For large batches, the impact is minimized as it is spread across a large quantity of units. For small to medium batches, however, the impact is much greater as there are fewer units. One potential way to reduce the setup time is to present more parts than required for the current product. There are negative aspects to this approach as it lengthens operation time by increasing distances of parts from the assembler, it requires more space, and it increases the risk that the wrong part will be installed. An additional problem is that the level of Work In Process (WIP) inventory is higher due to the extra parts. For these reasons, only the parts for the current products are usually presented to the assembler.

A typical kitting process is based on keeping all the parts in a separate area from the assembly process. Either a single set of parts are kitted into some type of tote and then delivered to the assembler, or a squared set of parts (ie: for a batch of 10 units, 10 of each component) are presented to the assembler. These parts are often handled manually, including walking the tote through the parts storage area to get the specific components required. This setup time can be done while the manufacturing area is still working on the previous batch so it does not necessarily increase manufacturing cycle time. This process does drive increased workload as the parts must be handled separately. If this process is used for large batches, the additional workload from the walking required offsets the setup time reduction (it would be less workload to move a whole box of parts).

To utilize both processes at one company can result in a loss of efficiency in parts management. This is a result of some parts being moved and tracked at the pallet or box quantity, and others being handled and tracked in units of one. The parts management aspect is critical as it drives the frequency and quantity of orders from parts vendors. Inventory records must be accurate, so the data entry mechanism must accept single transactions or group transactions easily. The level of inventory in parts inventory (PI) and work in process (WIP) also drives incremental costs to the business and must be minimized when possible. If box quantities and units of one must both be available, this can drive inventory levels higher which is counter productive. What is needed is a process that is efficient for both parts management and parts presentation of both large jobs and small jobs.

After assembly, the packaging process typically requires materials that take significant space, including boxes and cushions. In the case of computer packaging, shipgroup items such as the keyboard, mouse, and publications are also required. Once the unit is packed and the box is labeled with the serial number of the unit inside; it is palletized with other units of the same product type, stretchwrapped, and sent to distribution. Packaging is one of the most physically demanding operations, and units typically weigh more than the OSHA limit for one person to handle.

In a manufacturing facility that uses manufacturing lines with dedicated pack areas, pack materials for all units built on the line must be kept nearby. If the strategy is based on large orders of a specific model, the materials for the current product can be presented using material handling solutions such as boxmakers, and box conveyors for delivery to the pack stations. This approach usually requires a change-over each time the product type changes. If the strategy is oriented towards small orders, the units may be moved to areas with materials for those products available.

Conventional methods typically work well for one strategy or the other, but not both. The material handling approach has a much longer setup time. This approach does address ergonomic concerns by the implementation of hoists, box delivery conveyor, and other pack aids. If this approach is used, some subset of the materials (if not all) have to be changed before the next product can be built, increasing the setup time. For large batches, the impact is minimized as it is spread across a large quantity of units. For small to medium batches, however, the impact is much greater as there are fewer units. Due to the bulky size of the materials, it is not feasible to present too many different products at one time without decreasing operator efficiency.

If the different pack materials are kept in separate areas and the unit is moved manually to the area with the proper materials, workload and space requirements are increased. The key activities in a manual process that drive the workload increase include making the boxes by hand, moving the unit manually to the pack area, and moving the packed unit to a sortation area. If this process is used for a large batches, the additional workload offsets the setup time reduction.

To utilize both processes at one company can result in increased space requirements and increased complexity for management. Staffing cannot be shared between the two separate areas without potential capacity impacts on one line or the other. Due to the physical separation of the pack areas, cost is also increased as hoists and other material handling aids cannot be shared. What is needed is a process that is efficient for presentation of packaging materials and also addresses ergonomic concerns, regardless of job size.

SUMMARY OF THE INVENTION

A system monitored operations test area utilizes a central feed spur to deliver assembled products to parallel rows of test stations on each of its sides. A pivotal, sliding lift gate is mounted to each side of the central spur and is movable between vertical and horizontal positions. The gate can be moved along the length of the spur as needed. When the lift gate is in place, the operator can slide a unit into a desired test slot across the horizontally disposed gate which spans the distance between the spur and the selected test station.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
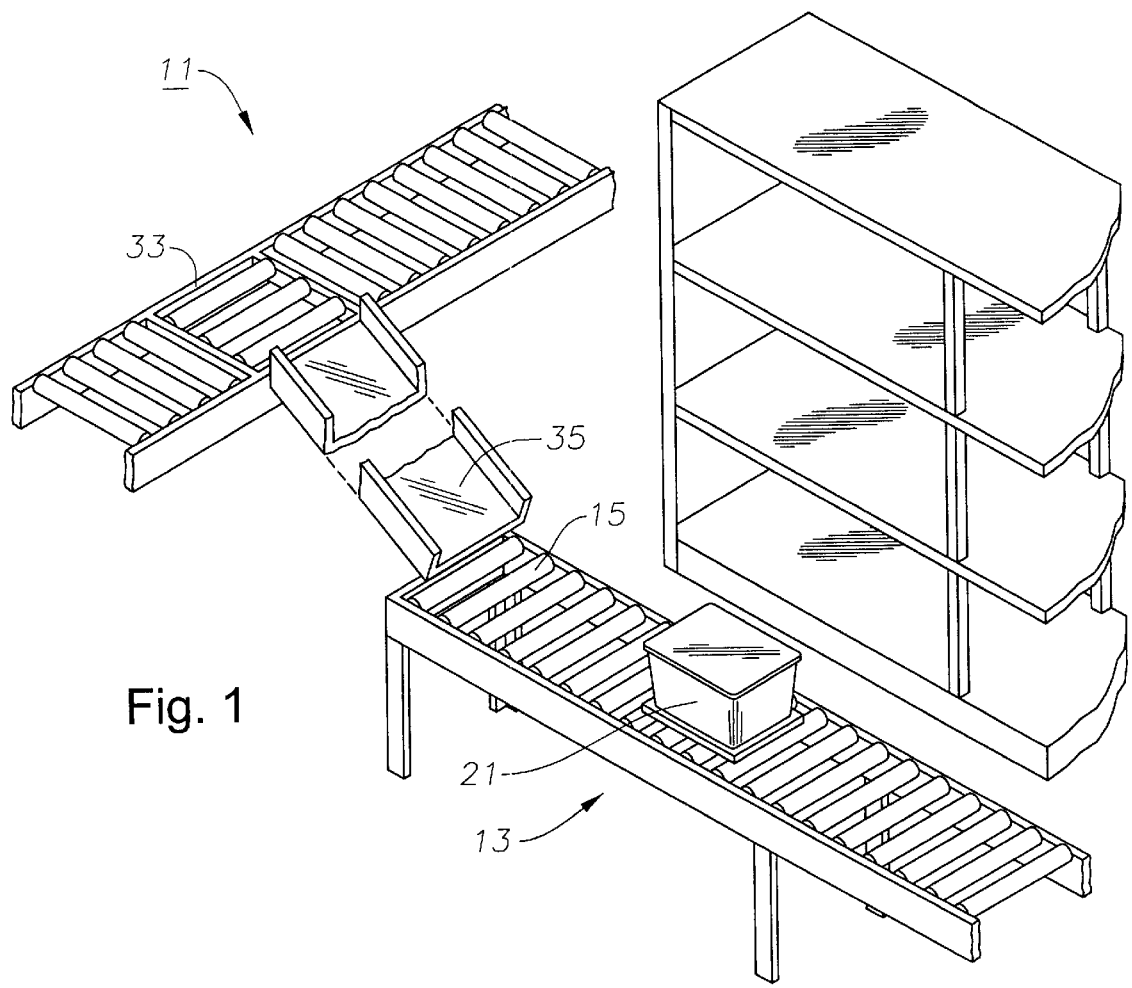
FIG. 1 is an isometric view of a kitting area constructed in accordance with the invention.
Figure 2:
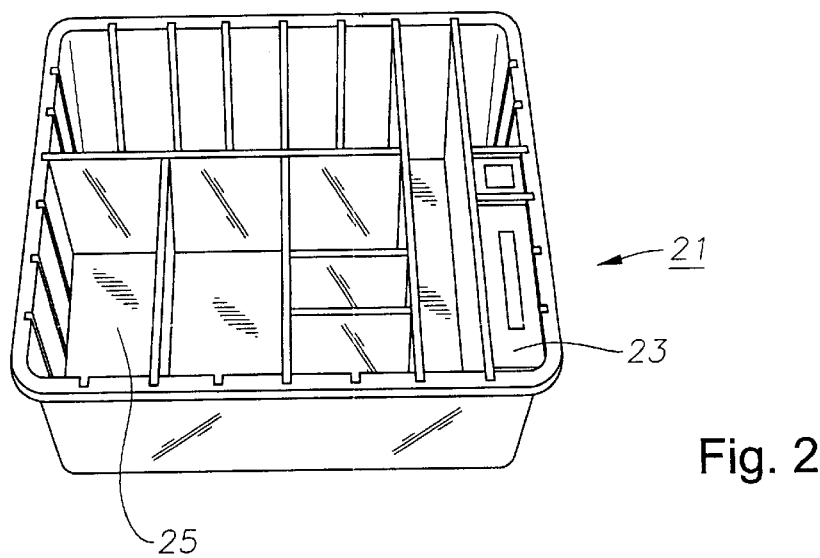
FIG. 2 is an isometric view of a tote shown without a lid and used in the kitting area of FIG. 1.
Figure 19:
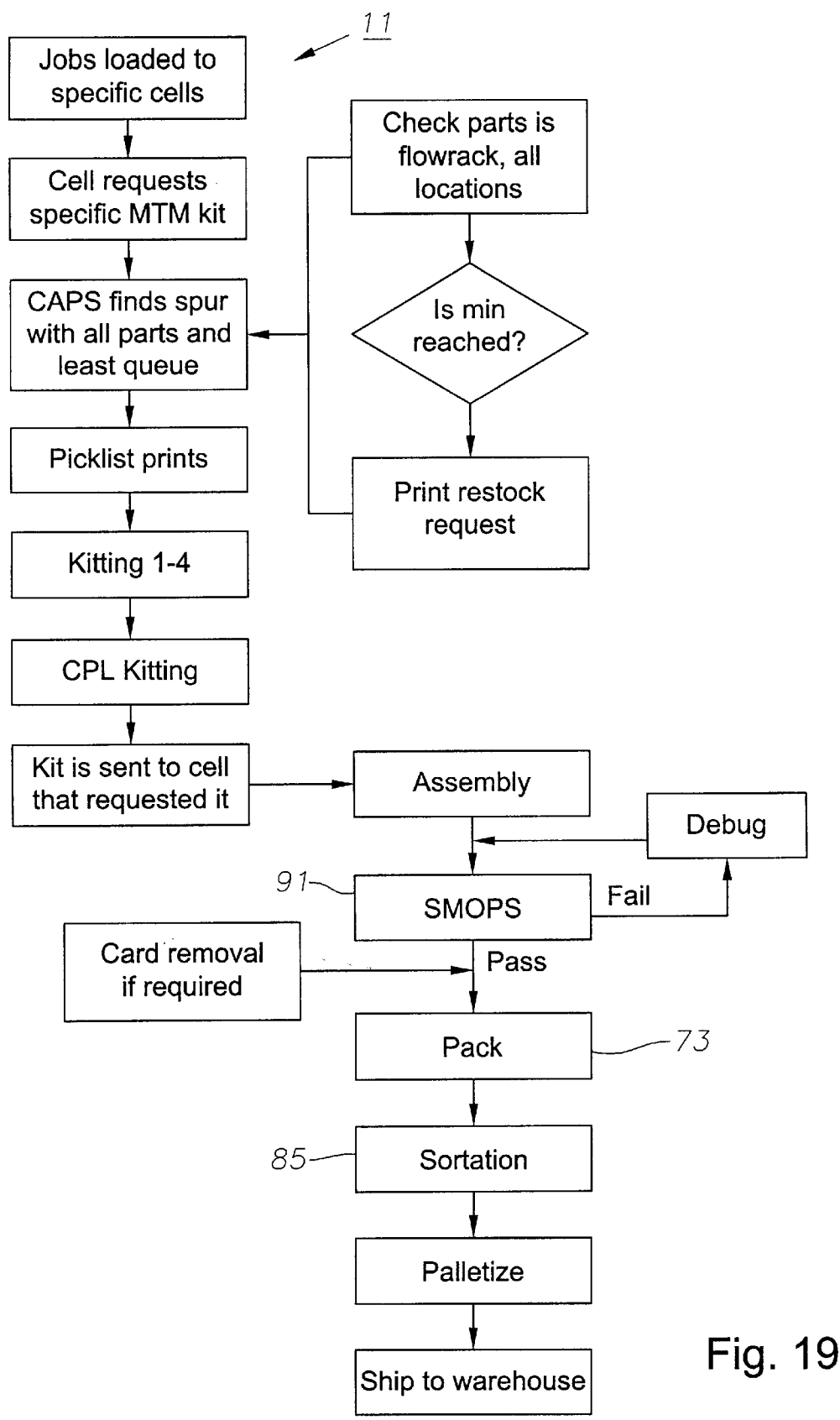
FIG. 19 is a summary flow chart of the operation described below.

Referring to FIGS. 1 and 19, a main kitting area 11 has a plurality of individual kitting lanes 13 (one shown). Each lane 13 is approximately 60 feet long with 18 inches of high gravity conveyor 15. The conveyors 15 move totes 21 (FIG. 2) having custom designed inserts 23. The inserts 23 are designed to accommodate many different components (planers, hard files, floppy drives, memory, processors, adapter cards, cables, etc.), and protect them from damage. This is critical as many components, such as hard files, are very sensitive and easily damaged. The tote 21 is made out of ESD plastic with custom designed inserts 23 made of ESD cardboard. Each slot has ESD foam 25 at the bottom, and the sensitive part locations are completely encased in ESD foam. Tote 21 is designed to carry a computer chassis 61 (FIG. 8) on the lid 29 (FIG. 3) and there is an opening 31 for memory and processor components to be added later.

Figure 4:
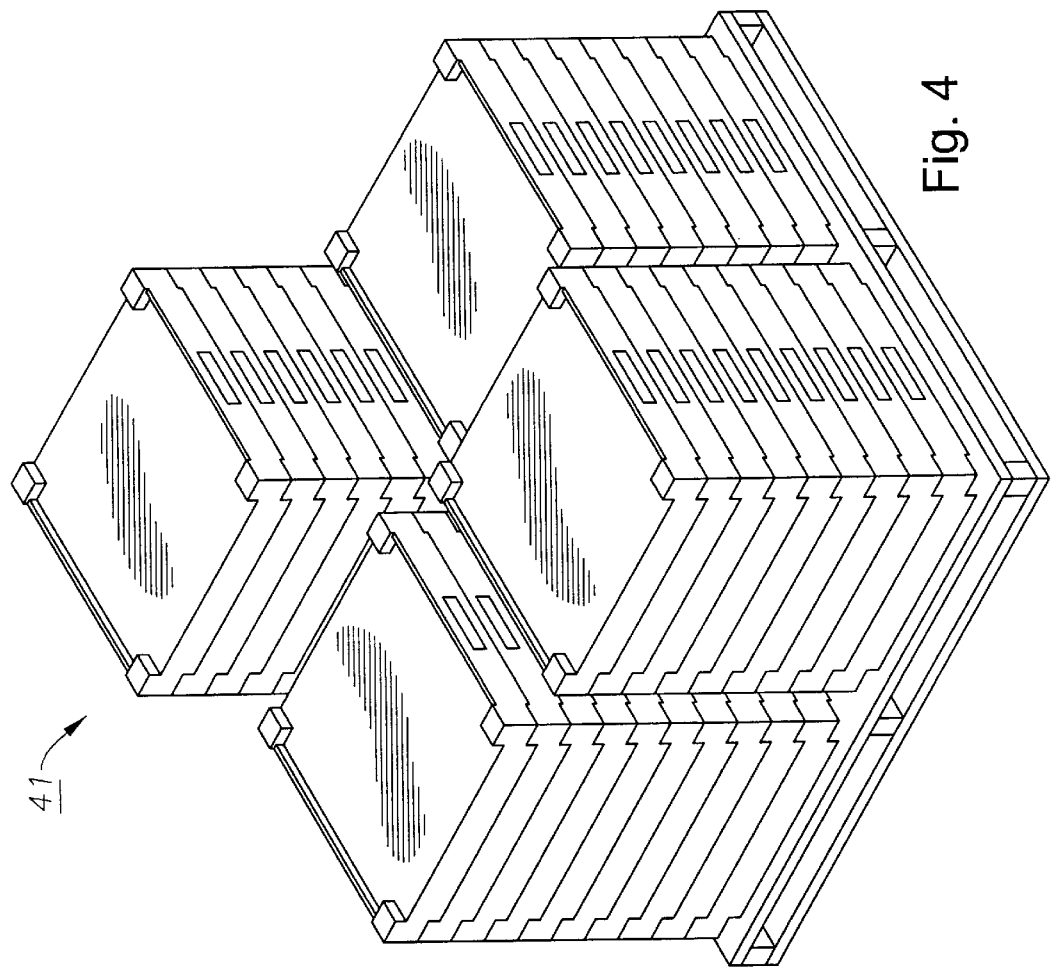
FIG. 4 is an isometric view of a plurality of trays used to transport the totes of FIGS. 2 and 3.
Figure 5:
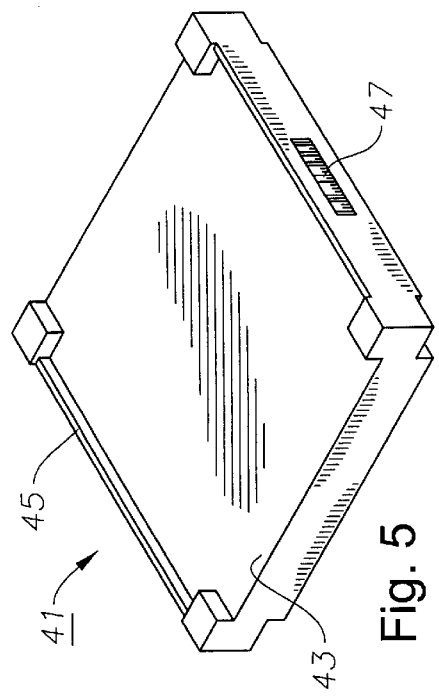
FIG. 5 is an isometric view of one of the trays of FIG. 4.

Referring again to FIG. 1, empty totes 21 are returned to the kitting area 11 from manufacturing cells (not shown) on an overhead conveyor system 33 to the beginning of the kitting lanes 13. One tote 21 at a time goes down a slide 35 to feed each lane 13. Adjacent to the bottom of the slide 33 is a pallet location for trays 41 (FIG. 4). Each tray 41 is designed to accommodate a full tote 21 and other components. They have built in nesting capability for ease of stacking unused trays 21, as shown in FIG. 4. Totes 21 are made from a heavy duty ESD plastic (FIG. 5). They are about 24 inches square with a smaller area indented for the tray mat 43. Two sides of the tray have a ¼-inch lip 45 along the entire edge to help prevent the units from sliding. The other two sides have a lip only on the corners which allow planers to be installed and cables to be easily plugged. Tray 21 also has barcode labels 47 which are used by the material handling system to continuously track trays 21 throughout processing.

The kitting lane 13 is lined with a combination of flowracks 51 (FIG. 6) and pallet conveyors 53. Each lane 13 has all the components required for several products. The kitting area 11 is classified as parts inventory storage with additional warehouse space adjacent to it, helping to minimize WIP levels and simplifying parts tracking. The kitting process is progressive, with each person adding a subset of the parts. This eliminates the incremental walking associated with presenting parts for multiple models. At the start of each kitting lane 13, the operator will pull the first available "Pick List" which specifies the machine type, model, and parts to be kitted. The operator selects an empty tray 41 and tote 21. The operator removes any dunnage from the tote 21 and discards it. Next, the barcode on the picklist is scanned, and the operator picks and scans the appropriate serial number and the barcode label 47 on the tray 21. This links the product or machine serial number to the tray 21. Each operator scans the pick list to activate the lighted flow rack system 55.

Figure 7:
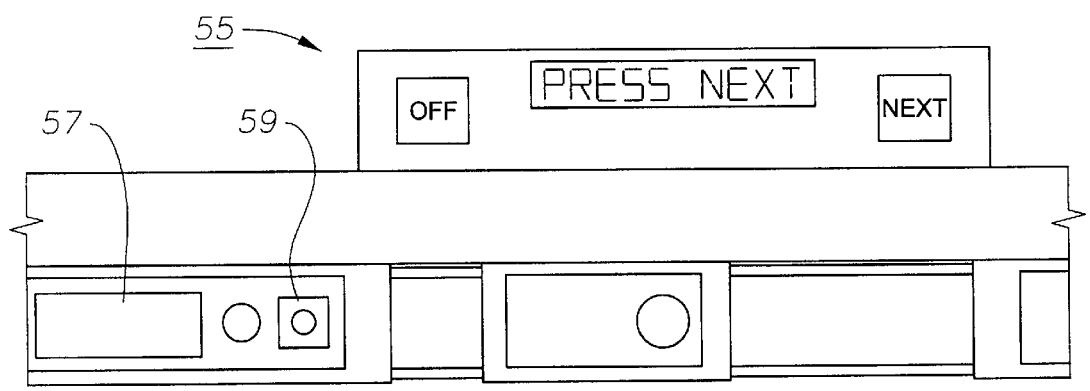
FIG. 7 is a front view of a flow rack processing system used in the kitting area of FIG. 1.
Figure 8:
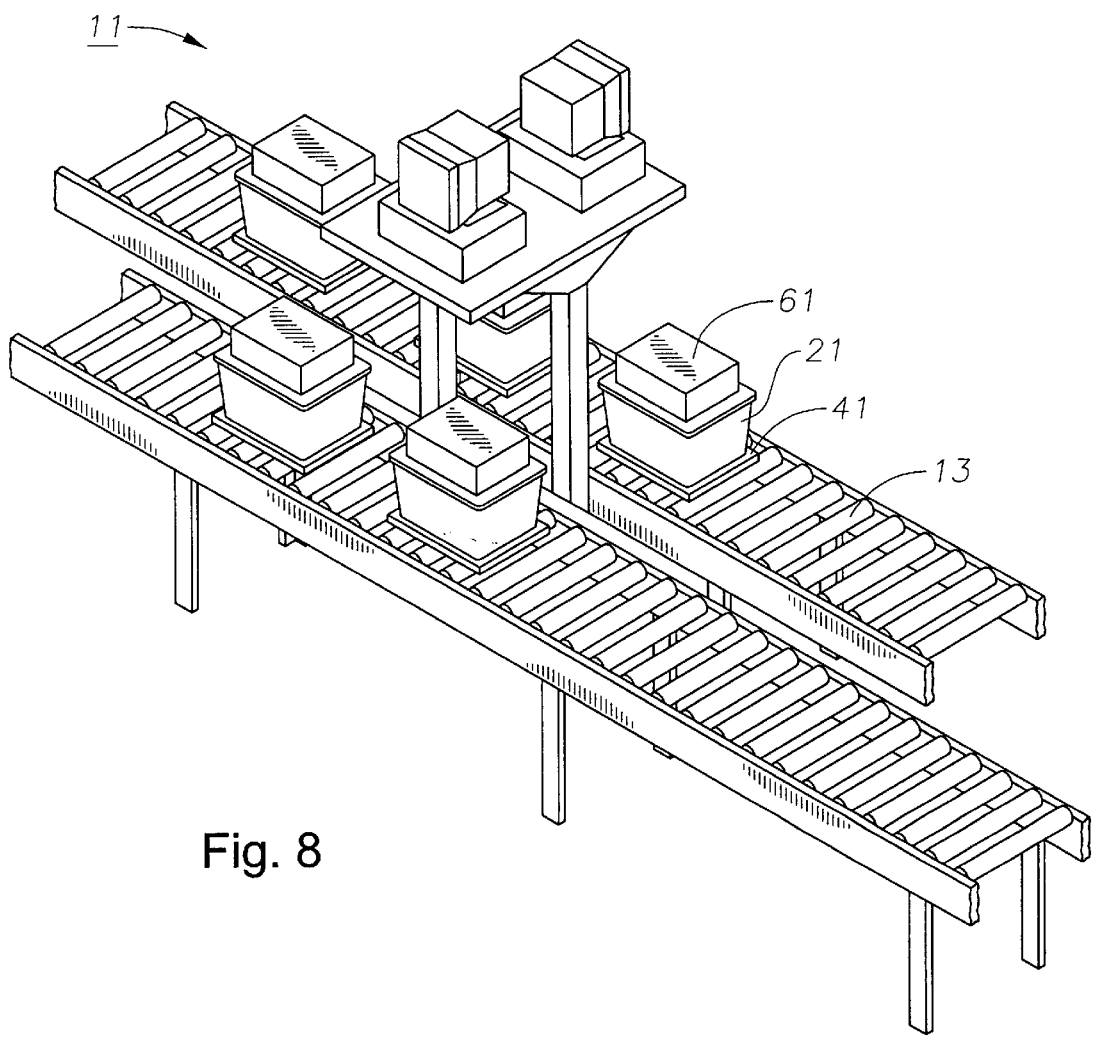
FIG. 8 is an isometric view of another portion of the conveyors of FIG. 6.

As shown in FIG. 7, a flow rack processing system 55 uses lights 57 to identify which parts are to be picked. To clear the light, the operator presses a button 59 which allows system 55 to provide inventory data on the kitting flow racks 51. Each operator scans the parts, places them into the tote 21, and slides the tote 21 to the next operator. This continues until the tote 21 is complete. The last step in the kitting area 11 is to place the lid 29 on the tote 21 and then the computer chassis 61 on top of lid 29 as shown in FIG. 8.

Kitting is divided into two separate areas. The majority of the parts are in the main kitting area 11 (FIG. 1), which contains the six kitting spurs 13 previously described. Trays 41 with totes 21 leaving this area then travel into a secured area on power conveyor where high dollar parts are stored (primarily memory and processors). This area is also parts inventory and contains its own receiving and shipping docks, a vault storage area, a processing area where heatsinks are attached to the processors and a kitting area where these parts are added into the tote 21.

Figure 3:
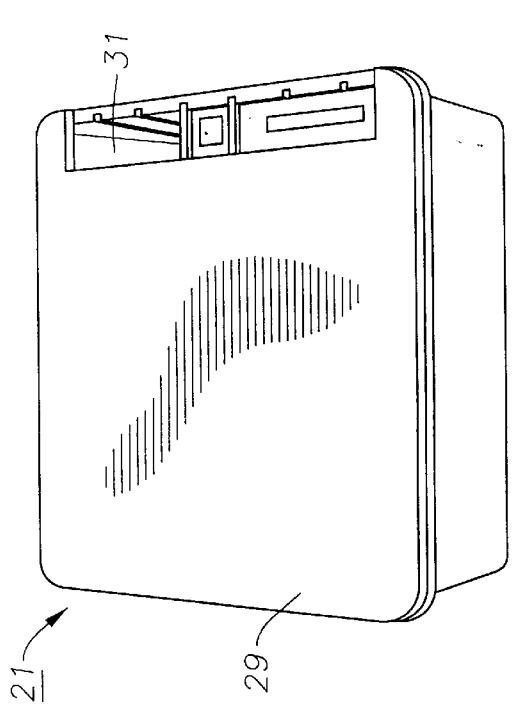
FIG. 3 is an isometric view of a tote shown with a lid and used in the kitting area of FIG. 1.

The power conveyor (not shown) delivers totes 21 into the kitting area which has eight stations. A kanban of the memory and heatsink/processor combinations are kept adjacent to these eight stations in flowracks. Individual units queue on the outer conveyor and transfer to a single queue location shared by two kitting stations. The operator will press a call button to bring a tote into their station. When one station pulls a unit in, another unit transfers to fill the queue. The operator uses the picklist to determine which parts should be added to the tote. These parts are scanned and then placed into the tote 21 through the opening 31 in lid 29 (FIG. 3). When the operation is complete, the operator steps on a foot pedal that raises a set of ball strips. The unit is pushed onto the inner conveyor which takes it out of the secured kitting space 11. The completed totes 21 travel up a belt incline to overhead supply conveyor which delivers the tote 21 to the area of manufacturing that requested it. As tote 21 goes up the ramp, it passes a scanner that automatically transfers all parts assigned to the tote from inventory to WIP.

The complication is knowing what parts each tote 21 should contain based on the manufacturing cell that requested it. The system has to be completely flexible, able to handle batches ranging from one to thousands. The flow rack system 55 (FIG. 7) was implemented to help overcome this issue. System 55 is a standard "pick to light" system used to help quickly identify the correct parts for a specific job. System 55 manages parts replenishment and interfaces with the job entry system and material handling program. The job entry system contains information identifying the parts in every order.

Figure 6:
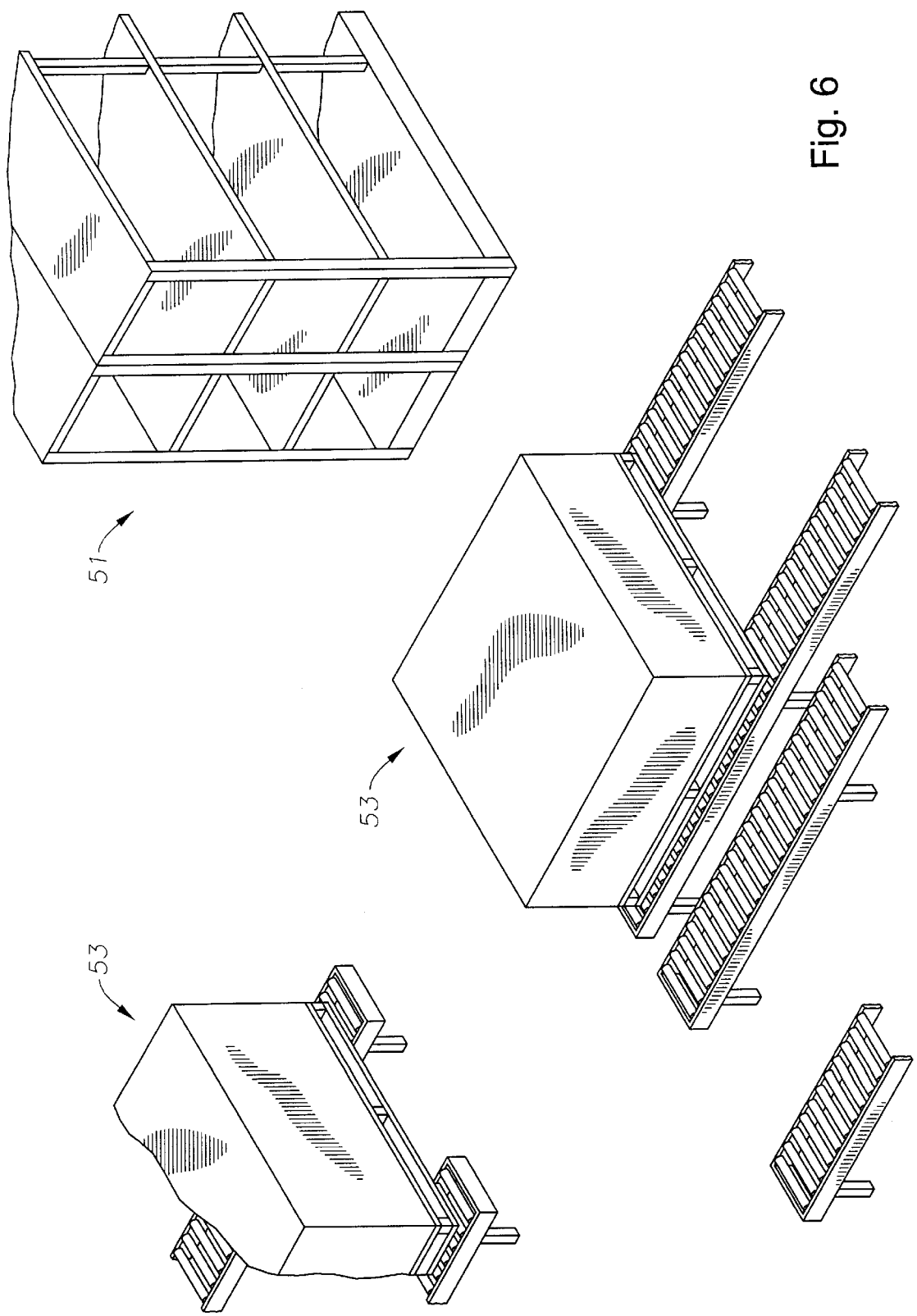
FIG. 6 is a schematic isometric drawing of a flowracks and conveyors used in the kitting area of FIG. 1.

When a manufacturing cell generates a request for another tote via the material handling system, flow rack system 55 prints a "picklist" with a barcode identifying all the parts that will go into the tote. This is the barcode that each operator scans as previously described. Each part has a specific location within the flowracks 51 (FIG. 6). There is a preset minimum and maximum for each of these locations. Each time an operator picks a part and clears the light 57, the location count is decremented. When the minimum is reached, a request is printed describing the part number and the quantity to be stocked for parts replenishment.

Figure 9:
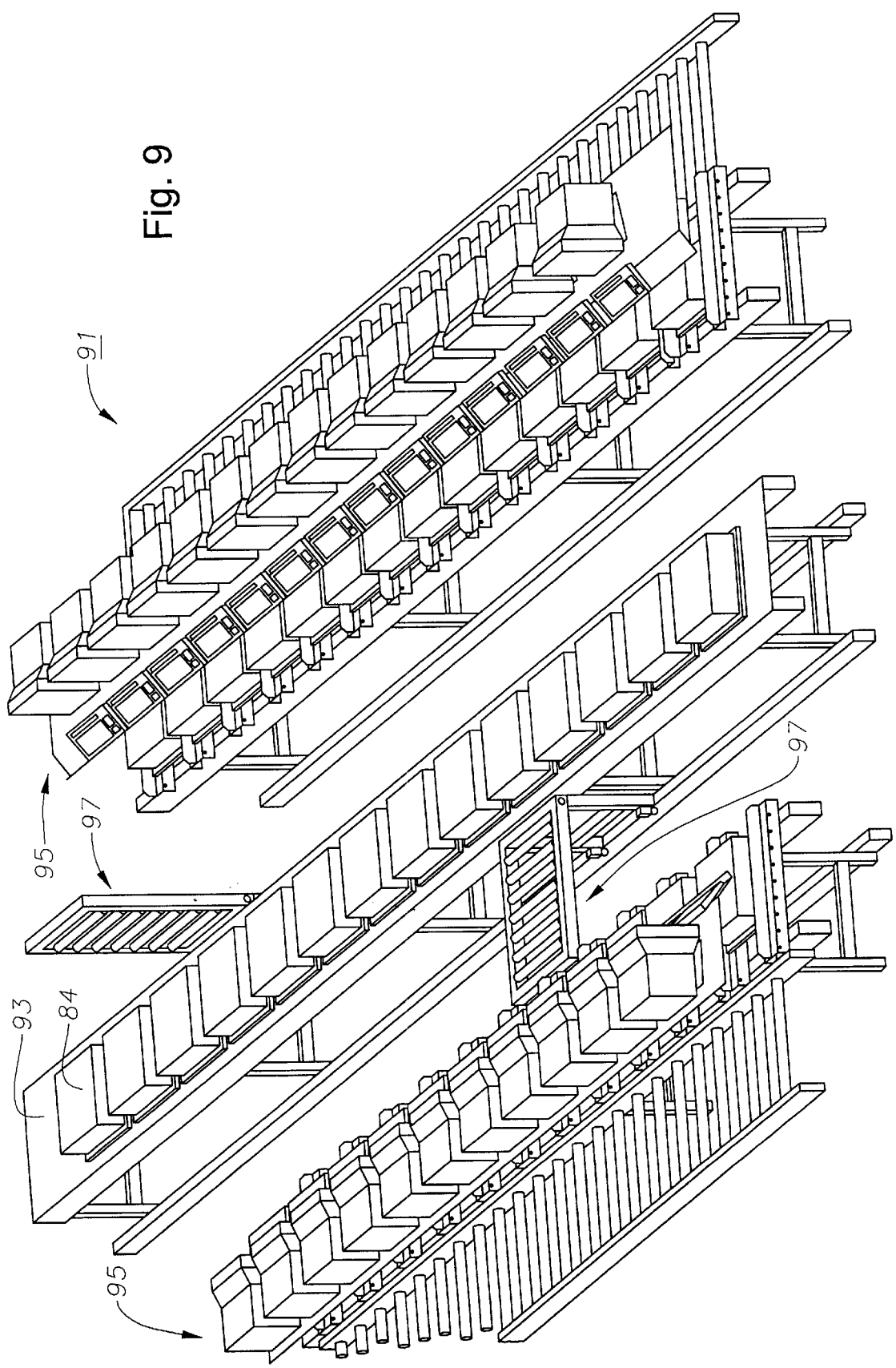
FIG. 9 is an isometric view of a system monitored operations test area.
Figure 10:
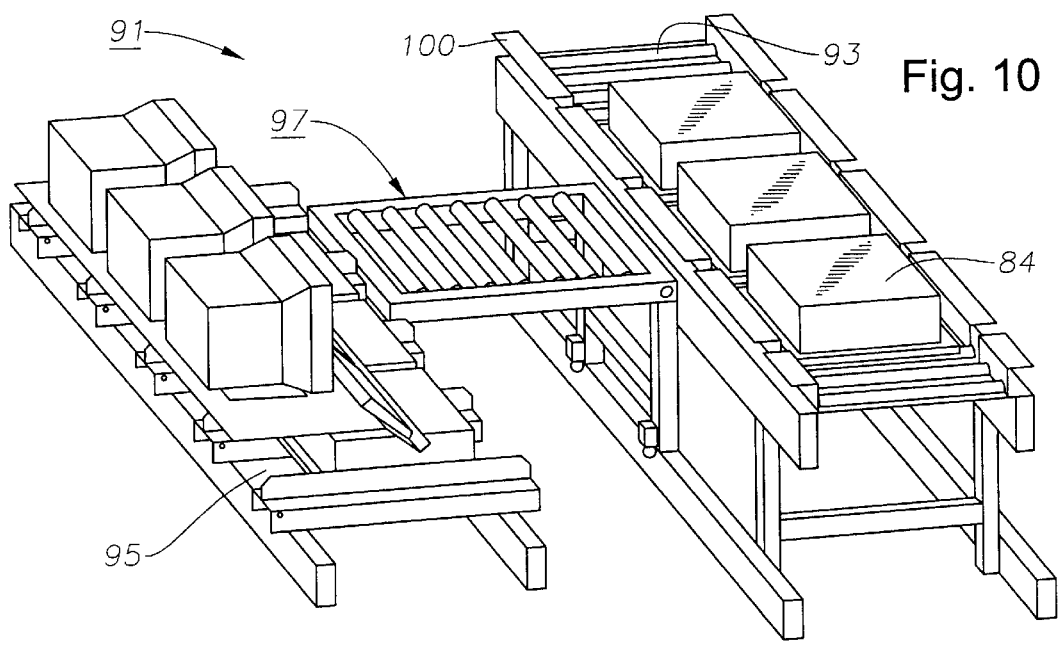
FIG. 10 is an enlarged isometric view of the test area of FIG. 9 in operation.
Figure 11:
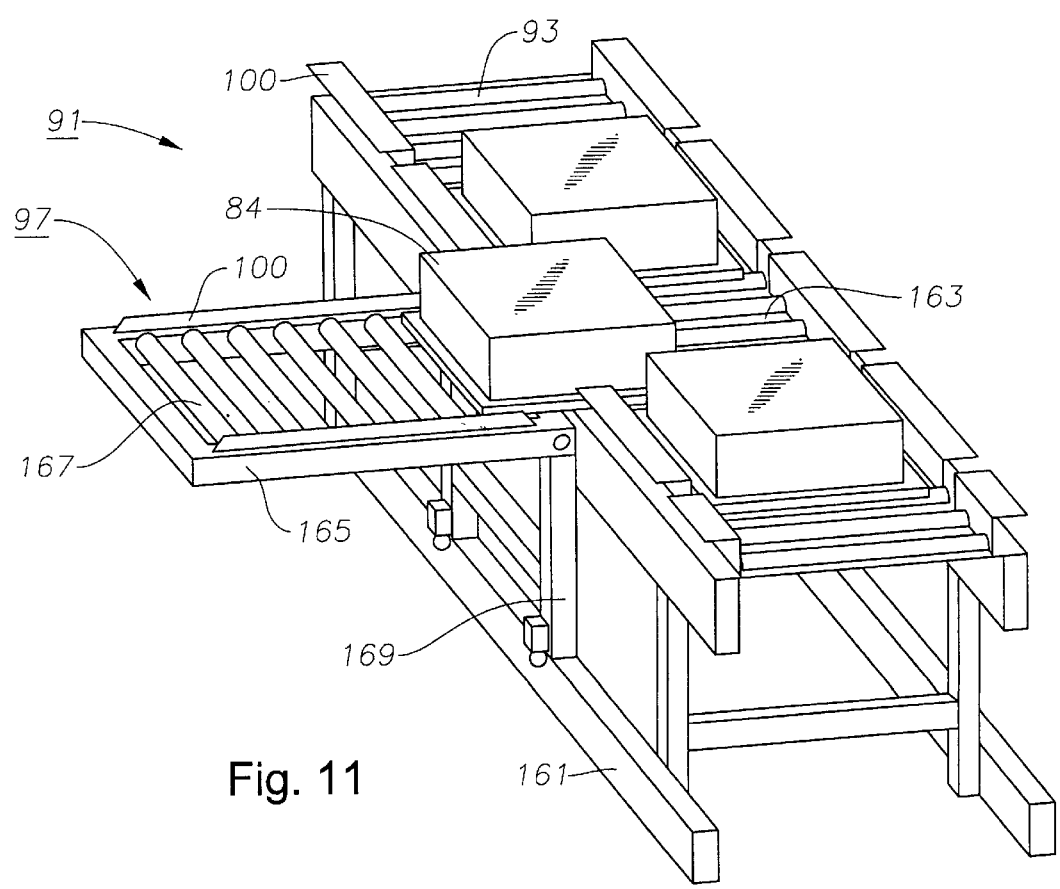
FIG. 11 is a further enlarged isometric view of the test area of FIG. 9 in operation.

During the assembly process, the work-in-process units are delivered to a system monitored operations (SMOPS) test area 91 (FIGS. 9 and 19). All tests except for a hi-pot test are performed in SMOPS 91. Each unit is pulled onto a gravity-fed center spur 93. This gravity spur 93 is approximately 50 feet long with twenty two test stations 95 on each side. There is a pivotal, sliding lift gate 97 on each side of spur 93. Gate 97 is pivotal between substantially vertical and horizontal positions. Gate 97 can be moved along the length of spur 93 when it is up or down. The operator will move the lift gate 97 adjacent to the test slot 95 that is to be loaded (FIGS. 10 and 11). When the lift gate 97 is in place, a ball transfer 98 on spur 93 automatically raises and guard rails 100 on spur 93 and gate 97 drop, allowing the operator to slide the unit into the test slot 95. The lift gate 97 is moved out of the way, the unit plugged in, and the run-in test is started. Once run-in is completed, pre-load automatically begins. Both run-in and pre-load are done over a local access network (LAN).

Each lift gate 97 is hingably connected to spur 93 which has a lower frame or chassis 161. The ball transfers 98 are located between a plurality of longitudinal rollers 163. The guard rails 100 are located along the sides of the rollers 163 on spur 93, and guard rails 100 on gate 97 are on each of its ends. As shown in FIG. 11, gate 97 is a rectangular frame 165 with rollers 167 that allow units to slide transversely off of spur 93 into test slots 95. Each gate 97 has a pair of vertical, parallel support legs 169 that are slidably mounted to a lower portion of chassis 161. Note that it is only the upper frame 165 of gate 97 that pivots. Legs 169 are fixed from motion except for the ability to slide along chassis 161.

Figure 12:
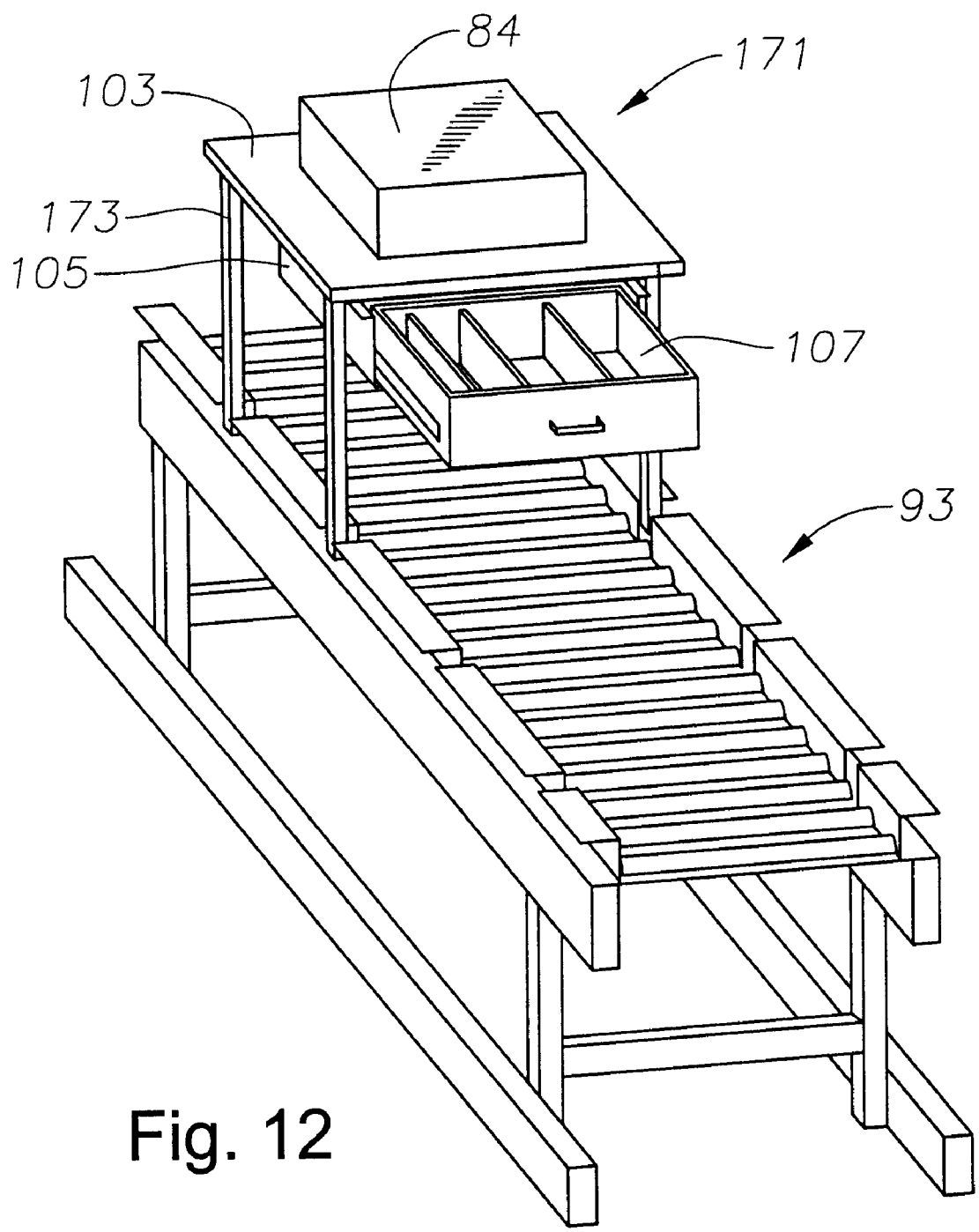
FIG. 12 is an isometric view of mobile, card removal station used in the test area of FIG. 9.

If the unit includes the LAN card as part of the bill of materials, the verification test also starts automatically over the LAN. If the unit does not include a LAN card, a previously inserted slave card is removed while the unit is in the test station 95 (the operator is prompted by the test code to remove the card). There is a longitudinally movable card removal station 171 (FIG. 12) over the center gravity conveyor 93 where the removed card is scanned out of the unit. Station 171 comprises four corner support legs 173 which elevate a shelf 103 above spur 93. Shelf 103 (FIG. 17) rotates on top of station 171 so operators on both sides of spur 93 can use it. It also has a roll-out shelf 105 where an ESD box 107 is kept for storing the removed cards. Once the card has been removed, the verification test is initiated from the test diskette created at the first assembly station 43a. The results of the test are written to the diskette.

Figure 13:
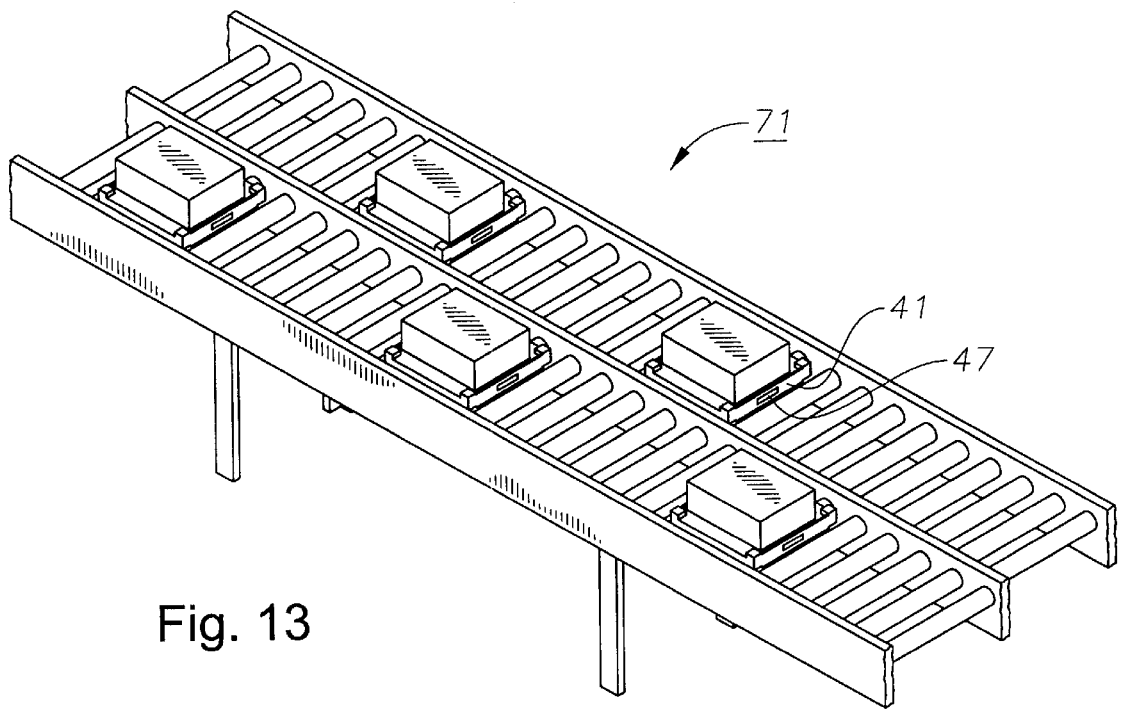
FIG. 13 is an isometric view of a pack raceway.
Figure 14:
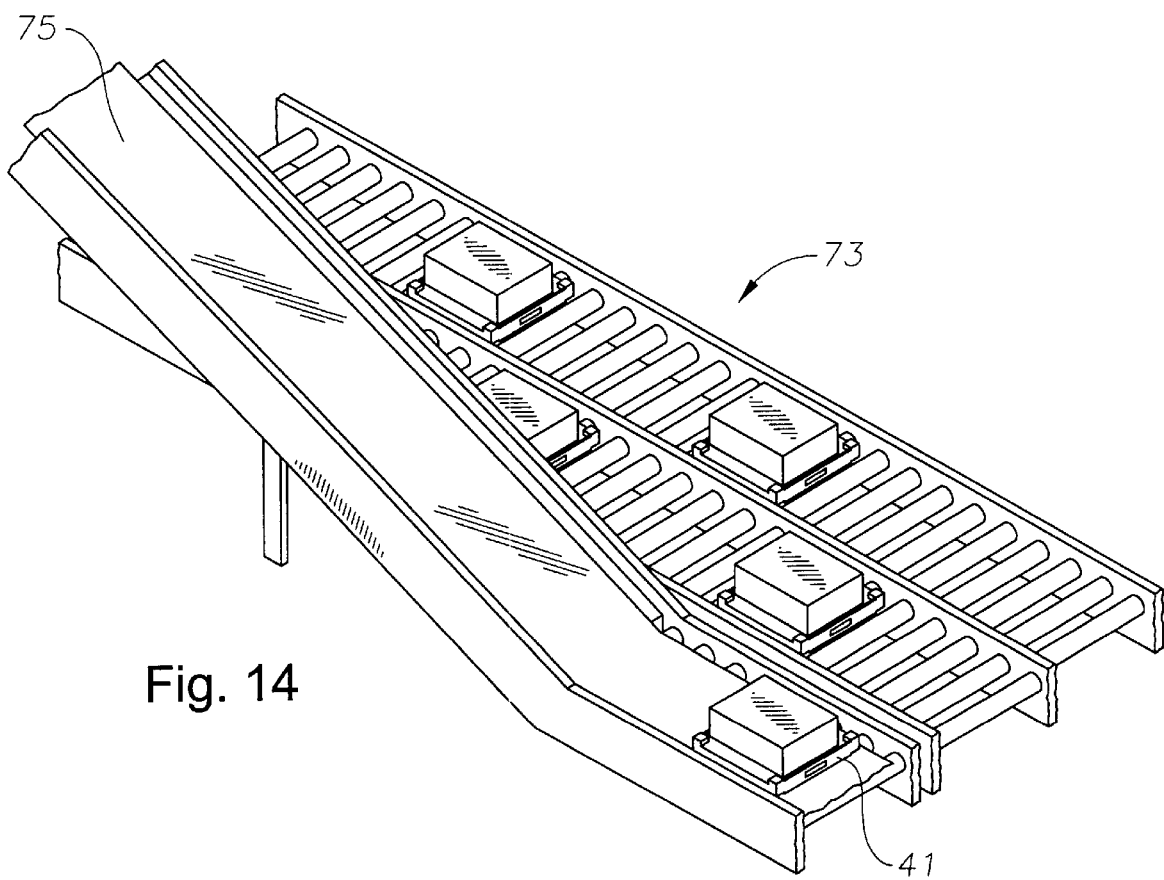
FIG. 14 is an isometric view of another portion of the raceway of FIG. 13.

After the component parts are assembled to chassis 61 and tested in the manufacturing cells, the completed assemblies are transported to a packaging area on output spurs. The output spurs convey the units to pack raceways 71 (FIG. 13). The barcode label 47 on the tray 41 is used to send the unit to a pack cell assigned to that product type. As trays 41 travel along the conveyor 71, system scanners located at each intersection will scan their labels 47. If the barcode cannot be read, the system sends the tray to a pack cell 73 (FIG. 14). Each pack cell 73 has a belt decline 75 that brings the tray 41 into the cell. If the pack cells 73 are full, units will circulate on the raceway 71 overhead until an opening occurs.

In the preferred embodiment, there are six pack cells 73 which are nearly identical to one another. A product type can be loaded to any combination of the six cells 73. Multiple product types can be assigned to the same cell 73 if required, although this is only advantageous if these products use the same shipping box and internal box cushions. The pack technician determines which products get built on which cell 73 based on capacity requirements. This is input into the material handling system and can be changed as required during the day.

Figure 15:
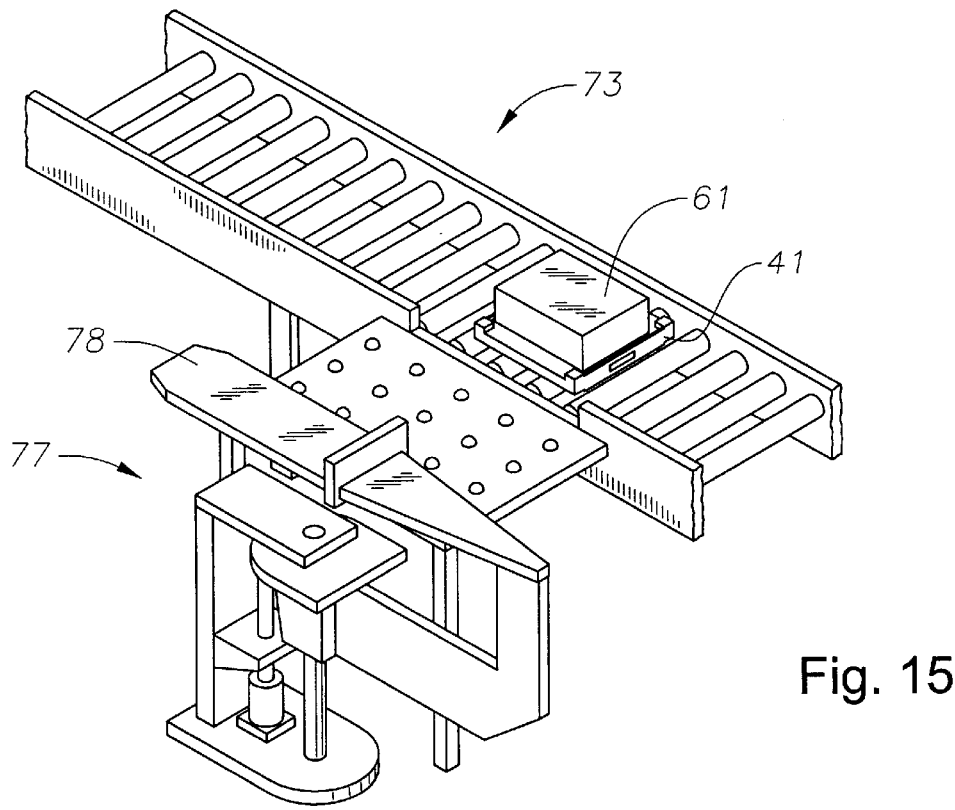
FIG. 15 is an isometric view of a pack station at an initial stage of operation.
Figure 16:
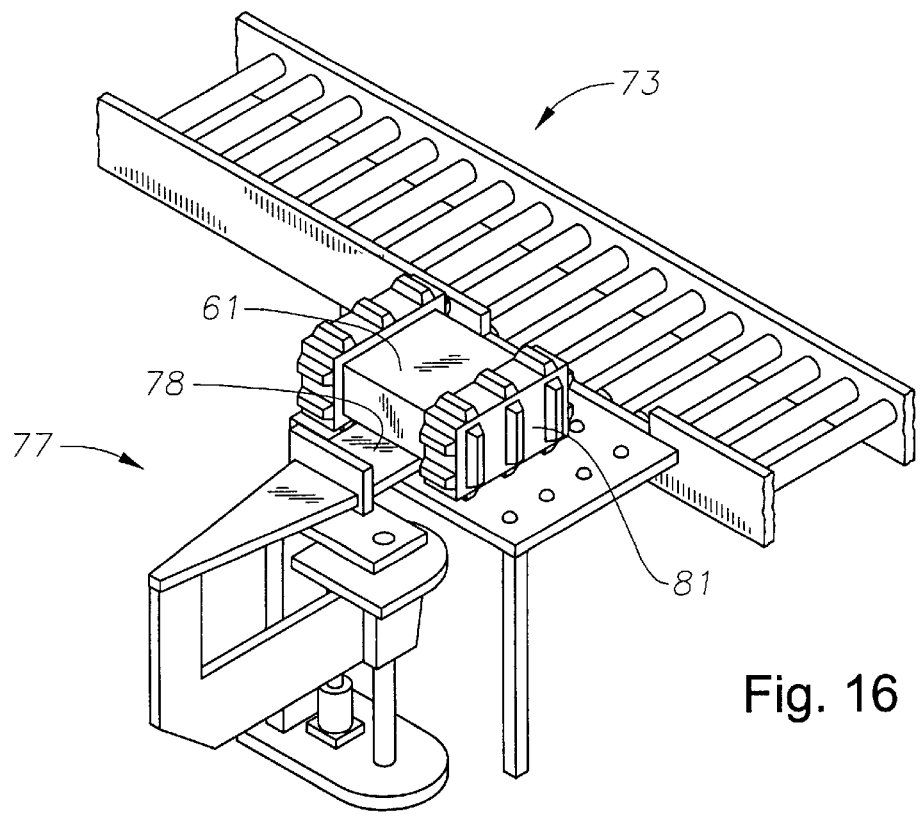
FIG. 16 is an isometric view of the pack station of FIG. 15 at an intermediate stage of operation.

Each workstaton 77 (FIG. 15) within the cell is the same, although some are mirror images of each other. The pack process is completed at one workstation 77 (it is not progressive). The pack operator presses a button to call a unit 61 into their station 77. Two pack operators share the same queue space, so as one pulls unit 61 in, another unit 61 transfers into the queue. The operator steps on a foot pedal to activate the popup balls and the pack pedestal 78. The unit is moved from the tray onto the pedestal, and the tray 41 is placed on a pallet next to the workstation. The operator places a bag over the unit 61 and pedestal and places the cushions 81 on the sides of the computer which overhang the pedestal (FIG. 16). The operator then creates the shipgroup box and adds the shipgroup items including keyboard, mouse, and publications.

Figure 17:
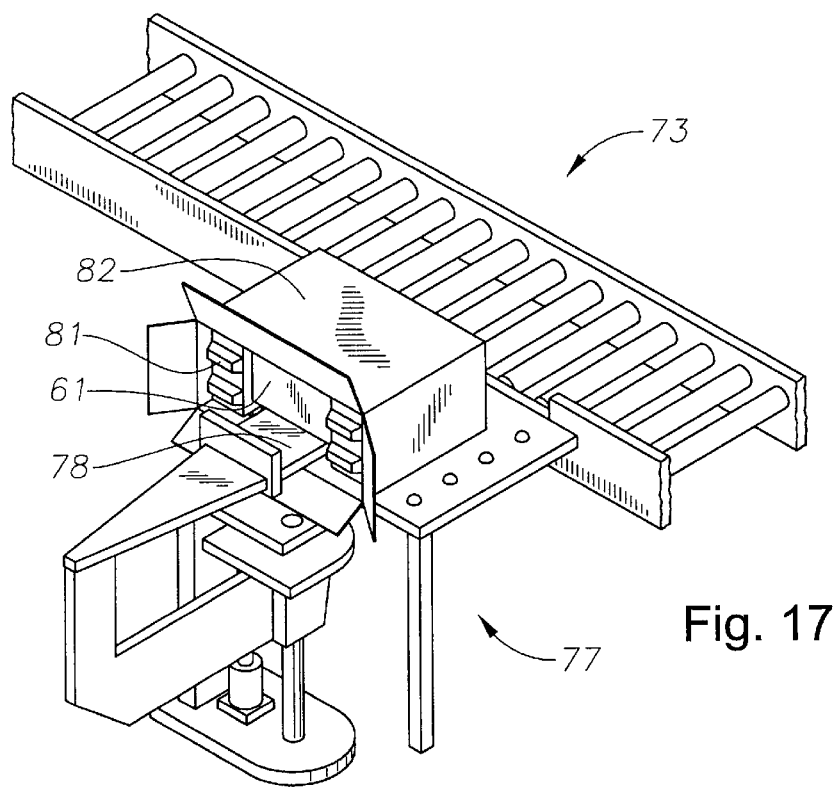
FIG. 17 is an isometric view of the pack station of FIG. 15 at a final stage of operation.
Figure 18:
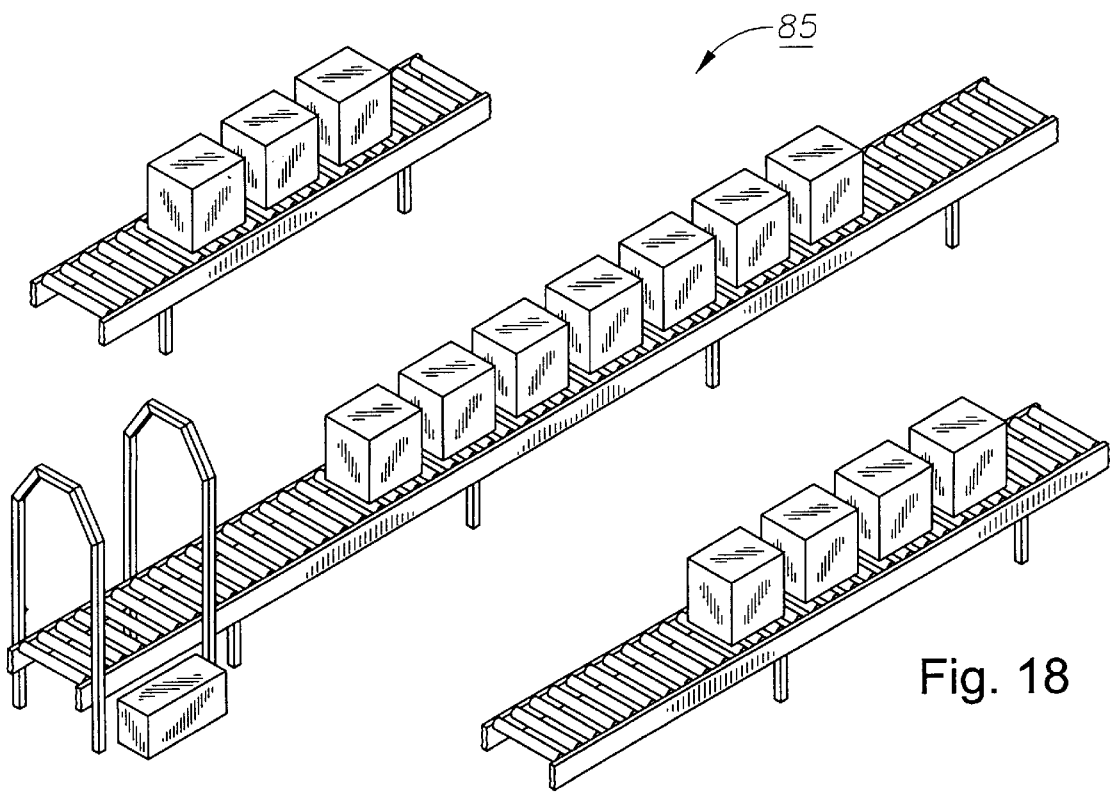
FIG. 18 is an isometric view of a sorting station.

All the shipgroup items are scanned into the system. Once all items are acknowledged, a box label is printed for the product containing the product type and serial number. This shipgroup is placed on top of the unit and cushions currently on the pedestal. The operator then selects a box 82 from the overhead box conveyor and slides it over the pack assembly on the pedestal (FIG. 17). At this point the operator steps on the pedal to lower the pedestal, and slides the box and computer off of the pedestal. The box label is placed on the box, and the completed box is tilted so that the untaped side is on top. The last step is to push the box onto an adjacent conveyor. Once the packed unit has left the cell, it is routed to an automatic taper, then up a belt incline into a sortation area 85 (FIG. 18).

The sortation area 85 consists of 18 lanes and is used to sort product types for palletization. Scanners read the box label to determine which sortation lane each unit should go to. Once a pallet quantity of a specific product type has accumulated, it is released to the palletizer. The palletizer automatically arranges the units on the pallet so the box label is visible on all boxes. Once the palletizer is complete, the pallet travels on a power conveyor to an automatic stretchwrapper. When the pallet has been stretchwrapped, it is loaded onto a trailer using a forktruck. The trailer is then shipped to distribution when it is full.

The invention has several advantages. The SMOPS test area spur and test stations are interconnected by a transportation system that efficiently handles work-in-process units as they arrive from assembly, and quickly moves them to available test stations with minimal effort by the operators. The problems of parts presentation for both small jobs and large jobs are overcome using a combination of bulk presentation and kitting. The hardware and software installed consists of both commercially available material handling options and custom designed systems integrated together.

This process works well for all job sizes as the MHS automatically initiates the tote at the kitting spur that has all of the parts required and the smallest queue by signaling the system to print out the picklist on that lane. The flow racks in each of the six lanes contain all parts for some of the products. The most frequently used parts can be found in all lanes and those less frequently used are only in a few of the lanes. Since the kitting area is parts inventory and is also adjacent to the warehouse space, parts replenishment is easily managed. Bulk parts are stored in the warehouse and in a kanban area within kitting, pallet/box quantities are loaded into the flow racks, and parts placed into the totes individually.

The tote travels down a gravity spur in front of the flow racks. The system has lights that are activated in front of only the parts needed in that specific tote. This eliminates the inefficiencies of looking for the parts manually (reading part numbers). The walking that would be required in a typical kitting area is eliminated by presenting the parts in flow racks and moving the tote along conveyor.

The high dollar parts area has maximized the efficiency by having dedicated docks and storage for these parts. The attachment of the heatsink to the processor is done in this area and maintained in a kanban so that they are ready for manufacturing. By having the flow go through this area using the power conveyor system described, these parts do not have to be relocated and handling is minimized while remaining secure. This saves cycle time and improves quality by reducing the opportunity for operator induced damage.

The packaging process works well for all job sizes as change-over is nearly eliminated. The only time a cell needs to be changed over is if the volumes of a specific product type significantly change. Products are assigned to cells based on having the same box and cushion. This keeps the setup time minimized. This also allows operators to consistently pack similar products, allowing them to work more efficiently.

Ergonomic issues are addressed by installing material handling aids including the boxmaker, box delivery conveyor, pack pedestals, automatic tapers and palletizers. By keeping pack separate from the manufacturing cells, the installation of these material handling aids is minimized helping to reduce cost, and staffing for the pack area can be optimized.

While the invention has been shown or described in only some of its forms, it should be apparent to those skilled in the art that it is not so limited, but is susceptible to various changes without departing from the scope of the invention.

We claim:

1. A test and transportation system, comprising:

a row of test stations;

a spur spaced apart from and parallel to the row of test stations, the spur having a longitudinal axis and an upper surface for transporting units along the spur;

a plurality of mechanical stops along a side edge of the upper surface of the spur, each of the stops corresponding to one of the test stations, and each of the stops having raised and lowered positions for allowing units to move laterally with respect to the spur;

a lift gate mounted to the spur and having a lowered position wherein the gate extends between the spur and the row of test stations, and a raised position wherein the gate is substantially vertical to allow passage of operators between the spur and the row of test stations;

a longitudinally movable station mounted to the spur and located above the upper surface of the spur for supporting selected ones of the units, wherein the movable station has a rotatable top and a roll-out shelf; and wherein when the gate is in the lowered position and substantially aligned with one of the test stations, an associated one of the stops that corresponds with said one of the test stations moves to its lowered position for allowing transfer of a unit from the spur, across the gate to said one of the test stations.

2. The test and transportation system of claim 1 wherein the upper surface of the spur, the test stations and the lift gate vertically align with one another when the lift gate is in the lowered position.

3. The test and transportation system of claim 1 wherein the lift gate is pivotally mounted to the spur and is longitudinally slidable relative thereto, and further comprising sliding means for allowing the pivotally mounted lift gate to slide along the spur.

4. The test and transportation system of claim 1 wherein the spur is a gravity feed system having a plurality of rollers on its upper surface and ball transfer mechanisms.

5. The test and transportation system of claim 1 wherein the roll-out shelf has an ESD box for storing electrical components.

6. The test and transportation system of claim 1, further comprising a second row of test stations that is parallel to s said row of test stations, and wherein the spur is centrally located between the two rows of test stations.

7. The test and transportation system of claim 6, further comprising a second lift gate identical to said lift gate and mounted to an opposite side of the spur for transporting units to the second row of test stations.

8. A test and transportation system, comprising:

two parallel rows of test stations spaced apart from one another by a selected distance;

a gravity feed spur parallel to and centrally located between the two rows of test stations, the spur having a longitudinal axis and an upper surface with rollers and ball transfer mechanisms for transporting units along the spur;

a plurality of mechanical stops along side edges of the upper surface of the spur, each of the stops corresponding to one of the test stations, and each of the stops having raised and lowered positions for allowing units to move laterally with respect to the spur;

a pair of lift gates mounted to opposite sides of the spur, each gate having a lowered position wherein it extends between the spur and an adjacent row of the test stations, and a raised position wherein the gate is substantially vertical to allow passage of operators between the spur and the adjacent row of the test stations;

a longitudinally movable station mounted to the spur and located above the upper surface of the spur for supporting selected one of the units, wherein the station has a rotatable top and a roll-out shelf; and wherein when one of the gates is in the lowered position and substantially aligned with one of the test stations, an associated one of the stops that corresponds with said one of the test stations moves to its lowered position for allowing transfer of a unit from the spur, across said one of the gates to said one of the test stations.

9. The test and transportation system of claim 8 wherein the lift gates are pivotally mounted to the spur and are longitudinally slidable relative thereto, and further comprising sliding means for allowing the pivotally mounted lift gate to slide along the spur.

10. The test and transportation system of claim 8 wherein the upper surface of the spur, the test stations and the lift gates vertically align with one another when the lift gates are in their lowered positions.

11. The test and transportation system of claim 8 wherein the roll-out shelf has an ESD box for storing electrical components.

12. A test and transportation system, comprising:

two parallel rows of test stations spaced apart from one another by a selected distance;

a gravity feed spur parallel to and centrally located between the two rows of test stations, the spur having a longitudinal axis and an upper surface with rollers and ball transfer mechanisms for transporting units along the spur;

a plurality of mechanical stops along side edges of the upper surface of the spur, each of the stops corresponding to one of the test stations, and each of the stops having raised and lowered positions for allowing units to move laterally with respect to the spur;

a pair of lift gates pivotally mounted to opposite sides of the spur and longitudinally slidable relative thereto, each gate having a lowered position wherein it extends between the spur and an adjacent row of the test stations, and a raised position wherein the gate is substantially vertical to allow passage of operators between the spur and the adjacent row of the test stations;

a longitudinally movable station mounted to the spur and located above the upper surface of the spur for supporting selected one of the units, wherein the station has a rotatable top and a roll-out shelf; wherein when one of the gates is in the lowered position and substantially aligned with one of the test stations, an associated one of the stops that corresponds with said one of the test stations moves to its lowered position for allowing transfer of a unit from the spur, across said one of the gates to said one of the test stations; and wherein the upper surface of the spur, the test stations and the lift gates vertically align with one another when the lift gates are in their lowered positions.

13. The test and transportation system of claim 12 wherein the roll-out shelf has an ESD box for storing electrical components.

* * * * *